United States Patent Office 3,168,495
Patented Feb. 2, 1965

3,168,495
PRODUCTION OF POLYOXYMETHYLENES
FROM TRIOXANE
Heinrich Hopff and Hermann Metzler, both of Zurich, Switzerland, assignors to Deutsche Gold- und Silber-Scheideanstalt vormals Roessler, Frankfurt, Germany
No Drawing. Filed Aug. 7, 1961, Ser. No. 129,900
Claims priority, application Germany, Aug. 17, 1960, D 34,032
2 Claims. (Cl. 260—67)

The present invention relates to a process for the polymerization of trioxane with the aid of organic compounds containing active halogen as catalysts for such polymerization.

Polyoxymethylenes can be produced either from monomeric water free formaldehyde or from low oligomers of formaldehyde, such as, for example trioxane, with the aid of various catalysts. A large number of processes have been described in the literature and proposed for the polymerization of monomeric formaldehyde. However, only a very few processes have become known for the polymerization of trioxane, the trimeric formaldehyde. According to U.S. Patent No. 2,795,571 trioxane is polymerized with catalysts of the type of boron trifluoride at elevated temperatures. According to such patent other Lewis acids, such as aluminum trifluoride, titanium tetrafluoride, manganese fluoride, silver fluoride and the like can be used instead of boron trifluoride.

According to the invention it was found that trioxane can be polymerized either in solution or as a melt to produce polyoxymethylenes when organic compounds containing active halogen, such as chlorine, bromine and iodine, are employed as polymerization catalysts. The term "active halogen" is employed herein to signify physically or chemically bound halogen which splits off under the conditions of the polymerization and behaves like free halogen. The following are illustrative of organic compounds containing active halogen: phenyl iodide chloride (iodobenzene dichloride) halogen succinimide, perchloromethyl mercaptan, Chloramine T (sodium p-toluene sulfonchloramide). The common characteristic of all of these active halogen containing organic compounds which may be mentioned is that they all are capable of serving as halogenating agents in preparative chemistry. It was found that all of the substances which come under this classification are catalytically effective for the polymerization of trioxane. However, it was found that phenyl iodide chloride is especially active and therefore is the preferred catalyst according to the invention.

The polymerization with the catalysts according to the invention can be carried out at temperatures between 50 and 150° C. and expediently at a temperature of about 100° C. The quantity of catalyst employed is 0.01 to 5%, preferably about 1%, with reference to the quantity of trioxane to be polymerized. In practice the process according to the invention can be carried out several ways, for example, the solid trioxane can be mixed with the catalyst such as phenyl iodide chloride and heating such mixture to the melting point whereupon the polymerization gradually occurs or the trioxane can be melted first and the catalyst added to the melt. After a certain time, depending upon the quantity of catalyst employed, the formation of the polymer slowly begins which gradually leads to solidification of the entire melt.

In the polymerization of trioxane at 100° C., the following relationship between the time required for the polymerization and the quantity of phenyl iodide chloride employed was found.

| Quantity of phenyl iodide chloride added in percent of trioxane: | Elapsed time before precipitation in minutes |
|---|---|
| 0.1 | About 26. |
| 0.5 | 5–6. |
| 1 | 2–3. |
| 2 | 0.7–0.8. |
| 4 | 0.5. |

With longer polymerization times the polymerization is almost complete with a conversion of 90% and over.

The process according to the invention can also be carried out in the presence of a solvent or diluent, preferably in the presence of a high boiling hydrocarbon under exclusion of moisture. For this purpose a solution or suspension of trioxane in the water free inert solvent is heated after addition of a sufficient amount of catalyst. If necessary, as in polymerization of the trioxane melt, superatmospheric pressures can be employed.

The polyoxymethylenes produced according to the invention can be freed of lower oligomers or unpolymerized trioxane and catalyst residues in the usual manner by washing with methanol.

The polymers produced have a melting point range of 160 to 180° C. and are soluble in boiling dimethyl formamide and dimethyl sulfoxide. The molecular weight of the polymeric product can be varied within wide limits by varying the quantity of catalyst and the polymerization temperature and can be adjusted as desired between 10,000 and 40,000. The solid polymer produced according to the invention loses 3 to 6% by weight upon heating for 2 minutes at 200° C.

The polymers according to the invention can be processed to shaped bodies by the processes normally used for thermoplastics, for example, by injection molding, compression molding and the like, or they can be used to coat objects. If desired, the process according to the invention can also be carried out in the presence of other known materials which improve the processing properties or the stability or the mechanical properties of the shaped bodies obtained from the polymers produced, such as, for example, plasticizers and stabilizers which react with hydroxyl groups, such as carboxylic acid anhydrides, ketenes and the like.

For certain applications an addition of an antioxidant can be of advantage. Furthermore, for certain applications the admixture of dyes, fillers or pigments with the polymer or with the reaction mixture can also be of advantage. All known fillers can be employed, such as, for example, carbon black, especially alkaline carbon black, and metal or metalloid oxides, such as aluminum oxide, titanium oxide, zirconium oxide, a silicon dioxide obtained by the reaction of volatile compounds of such metals or metalloids in the vapor phase at high temperatures in an oxidizing or hydrolyzing medium.

The following examples will serve to illustrate the process according to the invention. In such examples the proportions are given in parts by weight unless otherwise specified.

*Example 1*

100 parts of trioxane were melted in a reaction vessel and maintained at 100° C. After addition of 1 part of phenyl iodide chloride precipitation initiated after a 2 minute waiting period. After 1 hour the batch was cooled down and washed with methanol. 85 parts of a polymer having a melting point range of 160–165° C. were obtained. The molecular weight of the polymer was 25,000.

*Example 2*

100 parts of trioxane and 0.1 part of phenyl iodide chloride were sealed in an ampoule and the lower end thereof introduced into a heating bath maintained at 65° C. with a thermostat. After 36 hours a sublimate formed on the cool walls of the end of the ampoule projecting out of the heating bath whereas a part of the charge reacted in the lower end of the ampoule submerged in the heating bath. After washing with methanol a total of 60 parts of polymer were recovered. The sublimed portion had a melting point range of 170 to 180° C. and had a fibrous structure, whereas the product from the lower portion of the ampoule had a melting point range of 160–170° C.

*Example 3*

100 parts of trioxane and 0.05 (0.5%) part of phenyl iodide chloride were heated from room temperature to 90° C. in a half hour in a revolving autoclave and then heated for 5 hours at 100° C. while revolving the autoclave. After washing with methanol 75 parts of a polymer having a melting point interval of 170 to 175° C. were recovered. Its molecular weight was 27,000. Weight loss on heating at 200° C. for 20 minutes was 4.5%.

We claim:

1. A method of polymerizing trioxane which comprises heating trioxane in contact with 0.01 to 5% based upon the quantity of trioxane of an oranic compound active as a halogenating agent selected from the group consisting of phenyl iodide chloride, halogen succinimide, perchloromethyl mercaptan and sodium-p-toluene sulfonchloramide to temperatures between 50 and 150° C.

2. A method of polymerizing trioxane which comprises heating trioxane in contact with 0.01 to 5% based upon the quantity of trioxane of phenyl iodide chloride to temperatures between 50 and 150° C.

References Cited by the Examiner
UNITED STATES PATENTS
2,989,508   6/61   Hudgin et al. _____ 260—67

WILLIAM H. SHORT, *Primary Examiner.*

H. N. BURSTEIN, *Examiner.*